(12) United States Patent
Ziegler et al.

(10) Patent No.: US 10,460,363 B2
(45) Date of Patent: Oct. 29, 2019

(54) SYSTEM, METHOD AND COMPUTER PROGRAM FOR INTEGRATING DIVERSE POINT OF SALE SYSTEMS

(75) Inventors: Gary Kenneth Ziegler, Calgary (CA); Andrew Finall, New Westminister (CA)

(73) Assignee: ETHOR MEDIA LTD., Calgary, Alberta (CA)

( * ) Notice: Subject to any disclaimer, the term of this patent is extended or adjusted under 35 U.S.C. 154(b) by 830 days.

(21) Appl. No.: 12/870,420

(22) Filed: Aug. 27, 2010

(65) Prior Publication Data

US 2012/0054050 A1    Mar. 1, 2012

(51) Int. Cl.
| G06Q 30/06 | (2012.01) |
| G06Q 20/20 | (2012.01) |
| G06Q 30/02 | (2012.01) |

(52) U.S. Cl.
CPC .......... *G06Q 30/06* (2013.01); *G06Q 20/202* (2013.01); *G06Q 30/0268* (2013.01)

(58) Field of Classification Search
CPC ... G06Q 20/202; G06Q 30/0268; G06Q 30/06
See application file for complete search history.

(56) References Cited

U.S. PATENT DOCUMENTS

| 4,972,463 | A | * | 11/1990 | Danielson et al. ........ 379/91.01 |
| 5,924,077 | A | * | 7/1999 | Beach et al. .................. 705/7.29 |
| 6,384,850 | B1 | | 5/2002 | McNally et al. |
| 6,871,325 | B1 | | 3/2005 | McNally et al. |
| 6,982,733 | B1 | | 1/2006 | McNally et al. |
| 7,472,394 | B1 | * | 12/2008 | Meckenstock et al. ...... 719/310 |
| 7,685,023 | B1 | * | 3/2010 | Abraham et al. ............. 705/27.2 |
| 7,711,600 | B1 | * | 5/2010 | Curran et al. ................... 705/16 |
| 7,774,388 | B1 | * | 8/2010 | Runchey ....................... 707/811 |
| 8,146,077 | B2 | | 3/2012 | McNally et al. |
| 2001/0037245 | A1 | * | 11/2001 | Ranganath et al. ............ 705/16 |
| 2002/0049631 | A1 | | 4/2002 | Williams |
| 2002/0111868 | A1 | | 8/2002 | Silvestre |
| 2003/0014317 | A1 | * | 1/2003 | Siegel et al. ..................... 705/22 |
| 2003/0083944 | A1 | * | 5/2003 | Duvall et al. ................... 705/21 |

(Continued)

FOREIGN PATENT DOCUMENTS

| WO | WO 01/04818 A1 | 1/2001 |
| WO | WO 2008/092147 A2 | 7/2008 |
| WO | WO 2010/011688 A1 | 1/2010 |

OTHER PUBLICATIONS

Search Report and Written Opinion dated Dec. 19, 2011.

*Primary Examiner* — Ramsey Refai
(74) *Attorney, Agent, or Firm* — Perry + Currier, Inc.

(57) ABSTRACT

The present invention provides a system, method and computer program for integrating point of sale systems by providing a common data model. A system of the invention may include one or more point of sale agents linkable to one or more diverse point of sale systems. The system may also include an order manager linked to the point of sale agents. The one or more point of sale agents are operable to communicate point of sale data between the one or more diverse point of sale systems and the order manager by mapping the point of sale data to a common data model. The present invention also provides a system, method and computer program for enabling dissemination of promotions to consumers based on point of sale data.

20 Claims, 4 Drawing Sheets

(56) References Cited

U.S. PATENT DOCUMENTS

| | | |
|---|---|---|
| 2003/0120546 A1 | 6/2003 | Cusack |
| 2004/0128199 A1 | 7/2004 | Cusack |
| 2004/0162778 A1* | 8/2004 | Kramer et al. ............... 705/40 |
| 2004/0181453 A1 | 9/2004 | Ray et al. |
| 2005/0071512 A1* | 3/2005 | Kim et al. ...................... 710/1 |
| 2005/0289039 A1* | 12/2005 | Greak ............................ 705/37 |
| 2007/0055574 A1* | 3/2007 | Jensen et al. .................. 705/24 |
| 2008/0066098 A1* | 3/2008 | Witteman et al. ............. 725/34 |
| 2008/0208696 A1 | 8/2008 | Olson |
| 2008/0270514 A1 | 10/2008 | Soares Pi Farias |
| 2011/0125566 A1* | 5/2011 | McLaughlin et al. ..... 705/14.23 |

* cited by examiner

SYSTEM, METHOD AND COMPUTER PROGRAM FOR INTEGRATING DIVERSE POINT OF SALE SYSTEMS

FIELD OF THE INVENTION

The present invention relates generally to integrating point of sale systems. The present invention relates more specifically to integrating diverse point of sale systems by providing a common data model.

BACKGROUND OF THE INVENTION

Significant technological challenges have impacted the retail industry as a result of a fractured point of sale system infrastructure. Franchises, and even franchisees within a franchise, commonly use diverse point of sale systems. The challenge occurs when a franchise as a whole tries to do something as a single unit, such as online ordering. A particular franchise might, for example, have five diverse point of sale systems being used throughout their chain. In order to provide a unified online ordering system that works with all of their stores, they must implement five different custom integrations with five diverse POS systems, none of which "talk" to each other or are integrated with each other in any way. As a result, retailers desiring to offer online retailing cannot leverage point of sale data that is already available to them.

Several solutions for providing an integrated point of sale system have been proposed, however none of them provide integration of diverse point of sale systems.

United States Patent Publication No. 20030120546 to Cusack et al. discloses a system and method for facilitating real-time, web-based point of sale transactions and operations. This patent relates to a system and method for facilitating real-time, web based point of sale operations such as sales, reporting, etc. The system and method include and involve a central database management facility storing and managing data related to at least one user interface form operable within a browser application and to items which may be sold or otherwise processed at a point of sale. Also included and involved is a plurality of client data processing facilities which are coupled to the central database management facility via an electronic data network. Each client data processing system is located at a remote point of sale and is coupled to the central database management facility via a network connection over the electronic data network. Each client data processing facility is configured to execute the browser application, to access the central database management facility via the network connection to retrieve and process at least one user interface form within the browser application, to access the central database management facility in real time to retrieve data related to at least one of the items to facilitate a remote point of sale related operation, and to cause the central database management facility to manage the data based on the remote point of sale related operation.

United States Patent Publication No. 20080208696 to Olson discloses a point of sale system with web-based back-office. This patent relates to a system and a method for managing a range of businesses. The business operations range from a single branch to a large chain of stores or branches. This invention relates to the managing of the points of sale (POS) with web-based back-office systems. POS transaction engine terminals are implemented on personal computer, PC hardware using PC software with a relational database. The transaction engine architecture provides cost-effective application customization. Web-based back-office software is implemented on servers. POS and BO systems are monitored and supported via the web using protocol and open software components.

United States Patent Publication No. 20080270514 to Farias discloses a system for accessing a POS terminal, method for downloading and updating applications and method for performing electronic operation using such a system. This patent relates to a system for accessing POS terminals, with or without pin pad, using a client system to connect such POS terminal to a network comprised by at least one server, the system enabling any POS terminal to execute applications located in such servers, through a plurality of specific protocols in a process similar to the Internet, as well to download and update applications from application servers and to perform electronic operations in transaction serves.

None of Cusack et al., Olson, or Farias provide any means to integrate diverse point of sale systems for centralizing access to point of sale data. Furthermore none of these patent applications provide any means to leverage point of sale data from the point of sale systems for online promotion.

Therefore, what is required is a means by which to integrate diverse point of sale systems. What is also required is a means to leverage point of sale data from the point of sale systems for online promotion.

SUMMARY OF THE INVENTION

The present invention provides a system for integrating diverse point of sale systems, the system comprising: (a) one or more point of sale agents linkable to one or more diverse point of sale systems; and (b) an order manager linked to the one or more point of sale agents; wherein the one or more point of sale agents are operable to communicate point of sale data between the one or more diverse point of sale systems and the order manager by mapping the point of sale data to a common data model.

The present invention also provides a network implementable method of integrating diverse point of sale systems, the method comprising: (a) mapping point of sale data communicated by each of the diverse point of sale systems to a common data model; and (b) communicating, or facilitating the communication of, by means of one or more point of sale agents, the point of sale data between each of the diverse point of sale systems and an order manager in accordance with the common data model.

The present invention further provides a system for integrating point of sale systems, the system comprising: (a) one or more point of sale systems; (b) one or more point of sale agents linked to the one or more point of sale systems; and (c) an order manager linked to the one or more point of sale agents; wherein the one or more point of sale agents are operable to communicate point of sale data between the one or more point of sale systems and the order manager by mapping the point of sale data to a common data model.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE DRAWINGS

The invention will be better understood and objects of the invention will become apparent when consideration is given to the following detailed description thereof. Such description makes reference to the annexed drawings wherein.

Figure 1:
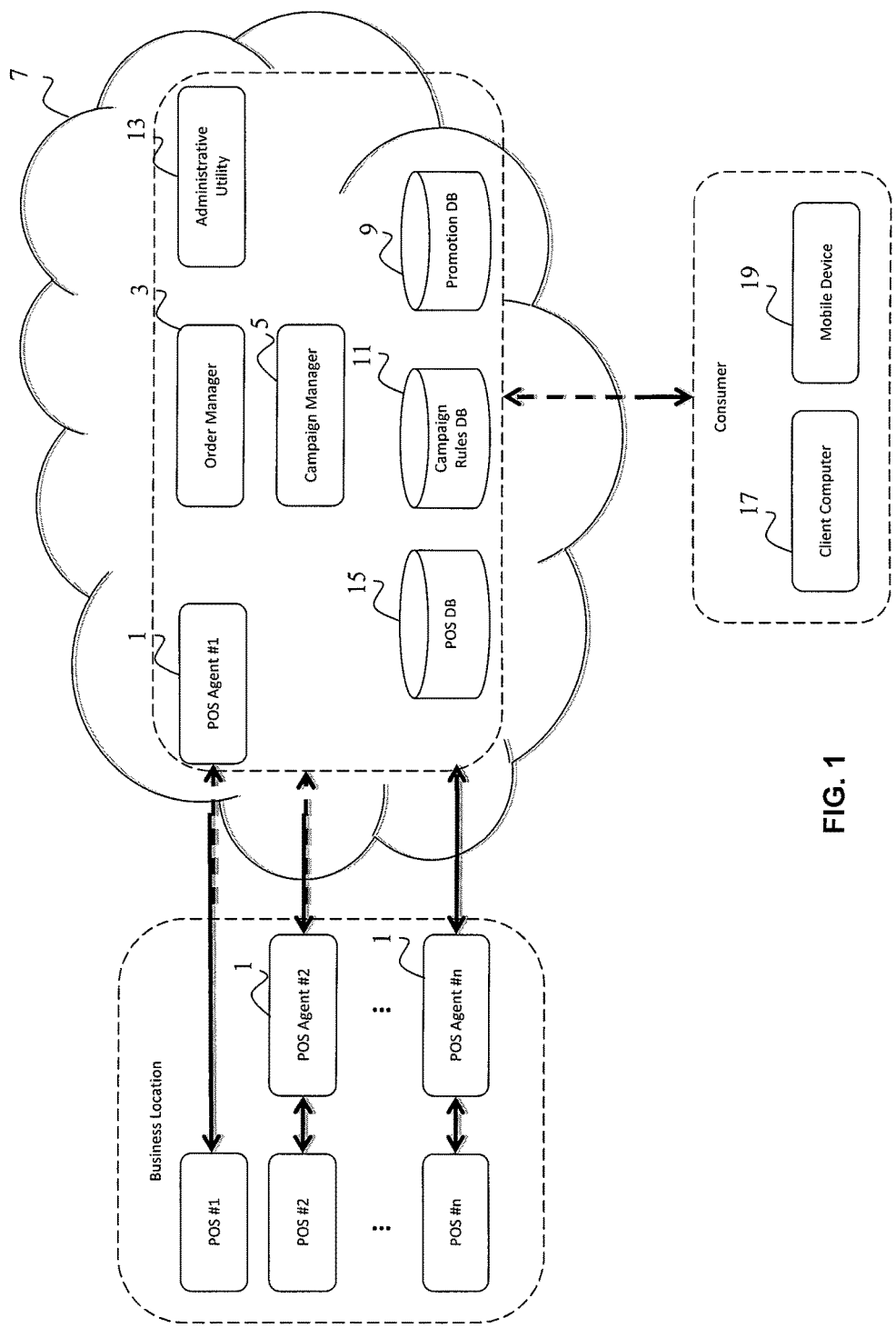
FIG. 1 illustrates a system in accordance with the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Unless defined otherwise, all technical and scientific terms used herein have the same meaning as commonly understood by one of ordinary skill in the art to which this invention belongs. Also, unless indicated otherwise, except within the claims, the use of "or" includes "and" and vice-versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise.

The invention will be explained in details by referring to the figures.

The present invention provides a system, method and computer program for integrating diverse point of sale systems. The present invention is operable to communicate with diverse point of sale systems to integrate point of sale data. The present invention also provides a system, method and computer program for enabling dissemination of promotions to consumers based on point of sale data.

The diverse point of sale systems may be owned and/or administered by one or more entities and/or related entities. For example, the entities may be unrelated retailers, related retailers (for example, franchises), or outlets of a commonly owned retailer. The retailers may be in any field of retailing, such as sellers of goods and services, restaurants, etc. The entity could also be a reseller or aggregator rather than a retailer, or a vendor of goods outside of a retail environment.

It should be understood that the present invention is not limited to any type of entity and that it could also be used for a plurality of entities that operate in different spaces, such as a retailer and a non-retailer, etc.

The present invention enables integration of diverse point of sale systems and use of their point of sale data for promotional dissemination. It enables real-time or near real-time access to and integration of diverse point of sale systems. Point of sale data corresponding to the point of sale systems may be made accessible to a consumer via the Internet, enabling the consumer to select a particular entity with which to deal and, despite the entity's particular point of sale system, enables the consumer to be provided with the most up-to-date point of sale data. The consumer could also access point of sale data across a plurality of the entities, so as to avoid the need to explicitly select a particular entity with which to interact.

The point of sale data can also be disseminated by a variety of third party media, including search websites, retail listing websites, restaurant reservation aggregators, etc. These third parties may leverage the point of sale data to offer item listings (such as restaurant menus, for example) and promotions, which can be dealt with directly using the entity's point of sale system by means of the present invention.

The present invention provides a common data model for enabling the integration of diverse point of sale systems. The point of sale systems may be provided by a third party or be custom/proprietary point of sale systems. Typically each point of sale system is provided on a computer, such as a personal computer, on site at a particular business location. However, it should be understood that the present invention is not to be limited to any particular configuration of a point of sale system. For example, a particular point of sale system for a franchisee may be located on a server computer at a franchise head office.

The system for integrating diverse point of sale systems may comprise one or more point of sale agents linkable to one or more diverse point of sale systems. The system may also comprise an order manager linked to the one or more point of sale agents. The one or more point of sale agents may be operable to communicate point of sale data between the one or more diverse point of sale systems and the order manager by mapping the point of sale data to a common data model. Another system in accordance with the present invention may include one or more of the point of sale systems, which may be linked to the point of sale agents.

The order manager may comprise an order interface enabling one or more consumers to access the order manager and thereby interact with the one or more diverse point of sale systems. For example, the order interface may enable the one or more consumers to make purchases corresponding to point of sale data. For example, point of sale data may include a business identifier, an item or service sold by the business, a price, a description, etc. This point of sale data may be accessible to a consumer by the order interface. The consumer may purchase the item from the business via the order interface. The order interface may then communicate with a point of sale system corresponding to the business by means of its corresponding point of sale agent to complete the purchase.

The system may also comprise a campaign manager linked to the order manager. The campaign manager may be operable to disseminate one or more promotions to one or more consumers based on the point of sale data. The campaign manager may also be operable to direct the one or more consumers to access the order interface. For example, the order interface may be a website and the one or more promotions may include a hyperlink to the website. A consumer could click on the hyperlink to access the order interface. For example, the one or more promotions may be disseminated through a medium such as contextual advertisements, social media feeds, emails, Internet-enabled messaging, or any combination of these media. For example, a consumer may be provided with a contextual advertisement generated by the campaign manager in response to a query on a third party website. The contextual advertisement may include a hyperlink to the order interface that is preconfigured to display point of sale data for an item or items that correspond to point of sale data, enabling the consumer to make a purchase of any of the items. The promotions may be created using the campaign manager or one of the diverse point of sale systems.

A point of sale database may be provided for storing point of sale data for the one or more diverse point of sale systems. The point of sale database may be linked to the order manager. The point of sale database may be useful for replication of point of sale data, so as to reduce communication requirements between the order manager and the potentially remotely located point of sale systems. In such a case, the point of sale database could be updated or refreshed from time to time, for example based on a polling model or subscription model. In a polling model, for example, the order manager may be operable to compare the point of sale data at the one or more diverse point of sale systems with the point of sale data stored in the point of sale database. If the order manager detects a modification, the order manager may selectively update the point of sale database. In a subscription model, for example, the one or more point of sale agents may notify the order manager of a modification to the point of sale data. The order manager may be operable to update the point of sale database with modified point of sale data in response to a notification of modification.

FIG. 1 illustrates a system in accordance with the present invention. The system may comprise one or more point of sale agents (1), an order manager (3) and a campaign manager (5) linked by a network (7), such as the Internet. The one or more point of sale agents (1), the order manager (3) and the campaign manager (5) may be provided by one or more centrally located or distributed computers linked to each other by means of a network such as the Internet, including in a cloud computing environment. Optionally, one or more of the point of sale agents (1) may be provided on site at the business location for the corresponding point of sale system. The one or more point of sale agents, the order manager (3), and the campaign manager (5) may be provided by one or more computer programs which when executed by a computer processor are operable to provide the features described herein.

The system may also include a point of sale database (15), promotion database (9) and campaign rules database (11), which are described below. The system may also include an administration utility (13), which is described below.

The system may be accessible by a consumer by means of a client device, such as a client computer (17) or mobile device (19). The client device may include or be linked to a web browser for accessing the order manager and/or point of sale data disseminated via third party website, as described more fully below.

The communication link between the point of sale agent and its corresponding point of sale system may be secure, for example by implementing an encryption technique and/or authentication, such as a mutual authentication technique. For example, both the point of sale agent and the point of sale system may be provided with a certificate to identify themselves with each other to establish explicit trust for any given communication. The point of sale agent may also be provided with constrained rights to minimize its capabilities in affecting point of sale data on the point of sale system. For example, the point of sale agent may be given read-only rights to "pricing" or "menu" point of sale data for a restaurant point of sale system, but read-write access to "ordering" point of sale data to enable remote ordering of items by a consumer. Any or all of these security measures may also be implemented in the link between the point of sale agent and the order manager.

Each point of sale agent may be operable to communicate point of sale data between its corresponding point of sale system and the order manager, by mapping the point of sale data to a common data model. The common data model enables the point of sale data for diverse point of sale systems to conform to a single common data encapsulation that can be recognized by the order manager to provide an integrated or unified system. The point of sale agents are operable to map point of sale data for any particular point of sale system to the common data model, so as to standardize the representation of the point of sale data for the order manager. The common data model enables both interoperability between diverse point of sale systems, and scalability of the system as a whole.

The point of sale data mapped to the common data model may include static and dynamic data. For example, in the context of a restaurant implementation, the point of sale data for each point of sale system may include a restaurant identifier (which may be static), delivery areas (which may be static), menu (which may be static), pricing (which may be dynamic) and promotions (which may be dynamic). By mapping the point of sale data for each point of sale system to the common data model, all point of sale data can be handled holistically across the entire system. The mapping of point of sale data by the point of sale agent may be configured by a system administrator or learned based on heuristics as the system expands.

Each point of sale agent may also enable remote provisioning and local point of sale system diagnostics, which are more fully described below.

The order manager is operable to access each of the diverse point of sale systems by means of the corresponding point of sale agent by communicating point of sale data therewith in accordance with the common data model. The order manager may be provided with real-time or near real-time access to the point of sale data for each point of sale system. The order manager may optionally access replicated point of sale data from a point of sale database.

A point of sale database may be linked to the order manager for storing point of sale data for one or more of the point of sale systems. The point of sale database may be updated or refreshed from time to time, for example based on a polling model or subscription model. Providing a point of sale database may be advantageous to reduce the need for communication of point of sale data between the point of sale systems, point of sale agents, and order manager, particularly where the point of sale data is static. For example, if a consumer is interested in static point of sale data such as a restaurant menu, this information does not typically need to be refreshed. At the time of a purchase of one or more items on a restaurant menu, however, it may be preferable to communicate with the point of sale system to establish a current price for the one or more items.

In a polling model, for example, the order manager may be operable to compare the point of sale data at the one or more diverse point of sale systems with the point of sale data stored in the point of sale database. This comparison can be made based on a preconfigured time interval (for example, every five second, five minutes, one day, etc.) or each time some particular point of sale data is communicated to the corresponding point of sale agent (for example, for an "order"). If the order manager detects a modification, the order manager may selectively update the point of sale database.

In a subscription model, for example, the one or more point of sale agents may notify the order manager of a modification to the point of sale data. This can be provided, for example, where the particular point of sale system includes an application programming interface (API) that notifies the point of sale agent of a modification. The point of sale agent can then initiate a corresponding notification to the order manager, which may be operable to update the point of sale database with modified point of sale data.

The order manager may also monitor connectivity status to each point of sale by means of each point of sale agent. For example, connectivity status may be monitored by each point of sale agent using an API provided by each point of sale system. The connectively status can be communicated from the point of sale agent to the order manager. The order manager may maintain a connectivity status list for recording the last known connectivity status of each point of sale system. If connectivity is lost to any particular point of sale system, the corresponding point of sale agent may notify the order manager of this status. If a consumer attempts to initiate a transaction that requires that particular point of sale system, the order manager can inform the consumer that the entity corresponding to the point of sale system is not orders via the order manager, and may optionally provide the consumer with means to place an order offline (such as a phone number or some other appropriate fall back). The consumer may still be given access to point of sale data that is available to the order manager.

Furthermore, the order manager can request a connectivity status update from any particular point of sale agent based on a preconfigured time interval, such as every five seconds, and the point of sale agent may correspondingly obtain the connectivity status for the point of sale system and communicate the connectivity status to the order manager. If connectivity is lost to any particular point of sale agent, the order manager can provide similar functionality as in the case of a point of sale system losing connectivity, as described above.

Figure 2:
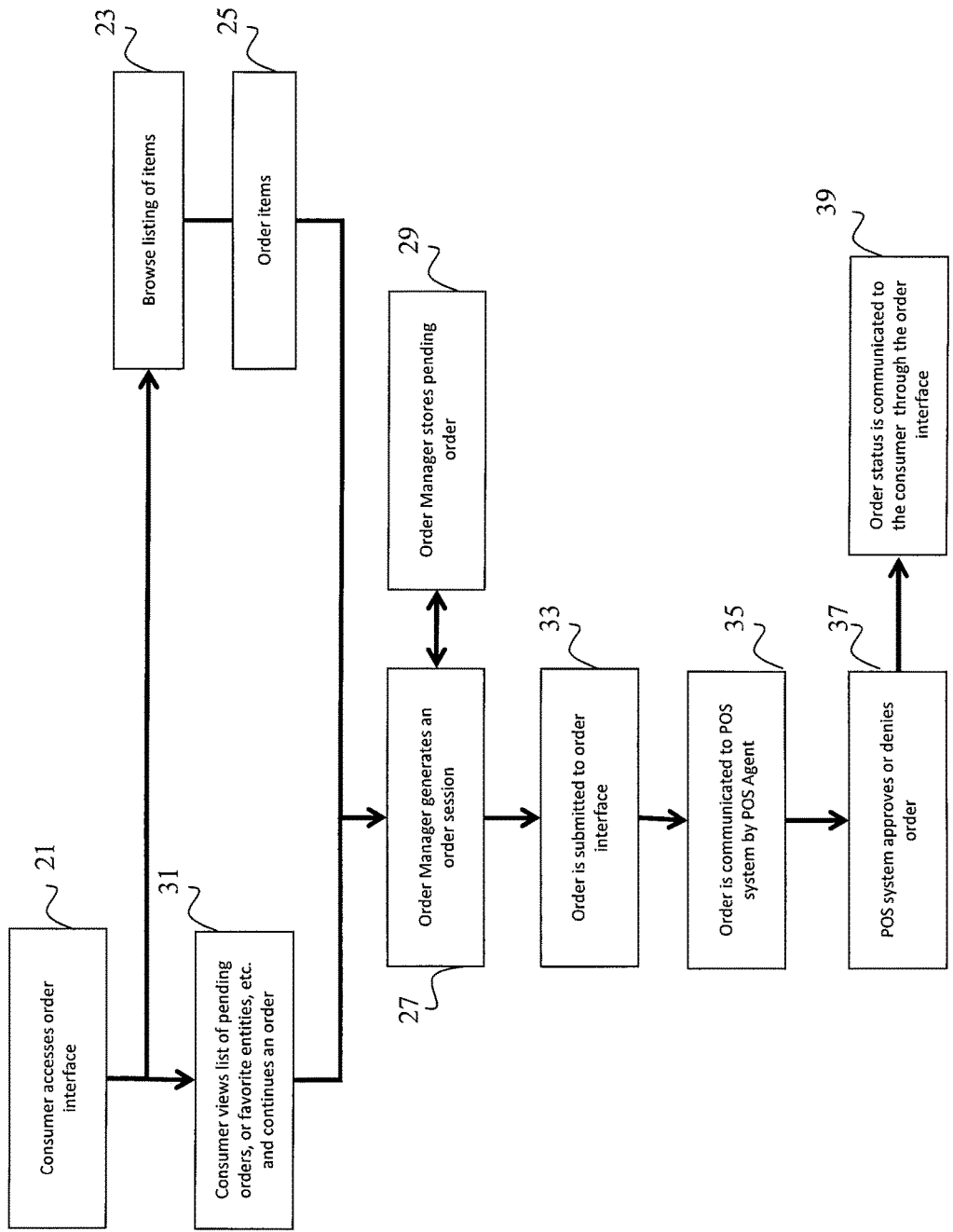
FIG. 2 illustrates a consumer accessing the order interface and browsing a listing of items accessible from the one or more entities to place an order for one or more items.

The order manager may include an order interface, enabling a consumer to place an order from one or more entities. The order interface may be a webpage accessible by a web browser, so as to enable online ordering. For example, FIG. 2 illustrates an example where a consumer could access the order interface (21) and browse a listing of items (23) accessible from the one or more entities, and could place an order for one or more items (25). The purchase price could be confirmed in real-time or near real-time with reference to the point of sale data known to the order manager or accessible from the point of sale systems by means of the point of sale agents. The order can therefore be placed directly through the point of sale systems by means of the order manager.

A separate order interface may be provided for different media that are used to access the order manager. For example, a mobile web page may be provided for accessing the order manager from a mobile device, and/or an application may be provided for accessing the order manager from a computer and/or mobile device and/or proprietary system. The order interface may also be accessible by an API that can be used on social networking websites, search engine websites, retailer websites, restaurant websites, etc.

Once a consumer accesses the order interface, the order manager may generate an order session (27) for tracking and recording the status of a particular order. The order manager may also maintain a record of past and pending orders (29). For example, a consumer may access the order manager by means of the order interface to initiate an order. The consumer may partially configure an order but not complete the order, or may configure an order in a sequence of steps. The order manager may save the order status for future retrieval. Correspondingly, the order manager may maintain consumer accounts for enabling retrieval of past and pending orders, or to provide a consumer with a list of favorite entities, orders, etc. based on past behaviour (31).

The order manager may communicate orders made by a consumer from the order interface to the point of sale systems for the entities. When an order is submitted to the order interface (33), it may be communicated to the respective point of sale system by means of a point of sale agent (35). The point of sale system may approve or deny the order and notify the point of sale agent of this status (37). The order status may then be communicated by the point of sale agent to the order manager, and displayed to the consumer by the order interface (39).

Figure 3:
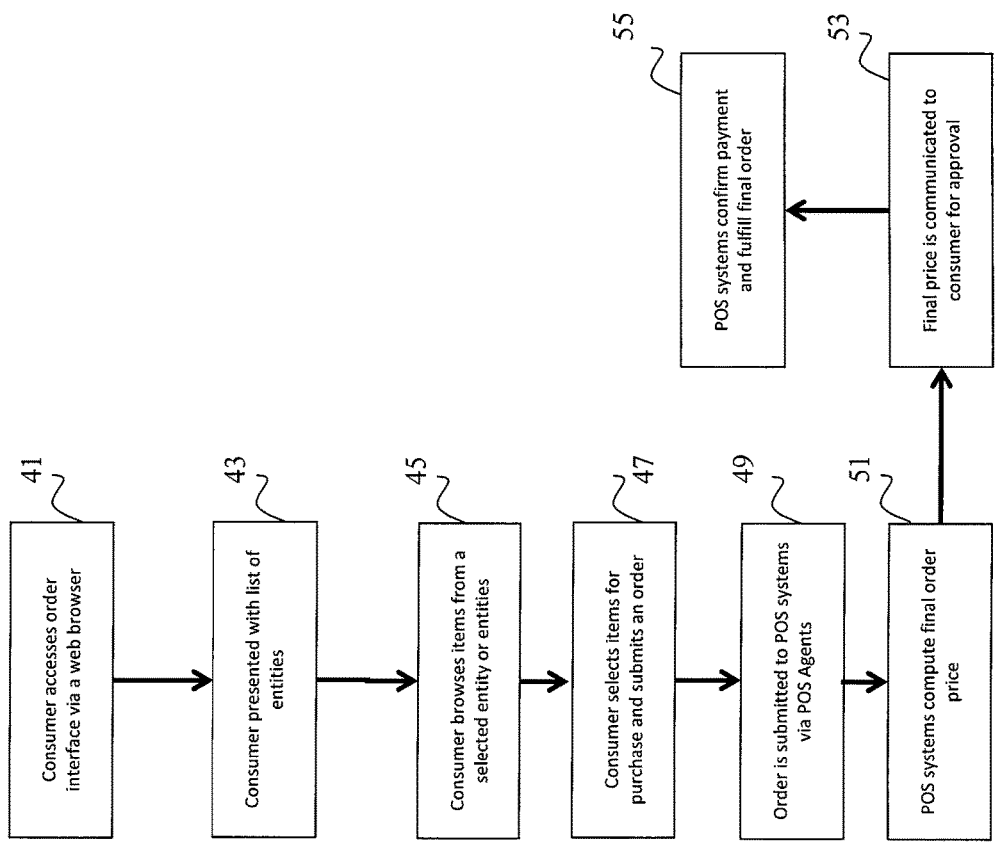
FIG. 3 illustrates a consumer accessing an order interface website by means of a web browser.

FIG. 3 illustrates a particular example in which a consumer may access an order interface website by means of a web browser (41). The consumer may be presented with a list of entities (43) that have a point of sale system linked to the order manager by a point of sale agent. This list of entities may be obtained from the point of sale systems at the time the consumer accesses the order interface, or collected from the point of sale database from previously obtained point of sale data (2).

The consumer may select a particular entity with which to deal and/or could search for or browse for one or more particular items that are available from the entities as a collective (45). For example, if the consumer selects a particular entity, the order interface may then present the consumer with items and/or pricing and/or promotions available from that entity. The consumer may select one or more of the items for purchase and submit an order through the order interface (47). Optionally, the order interface may require the consumer to provide identifying information, such as name and address, and payment information, such as a credit card or deposit account.

The order interface may communicate the order information to the point of sale agents for point of sale systems from which items are to be purchased (49). The point of sale systems may approve or deny the order and notify the point of sale agents of same. The point of sale systems may also compute the final order price, including taxes, delivery, or other surcharges or discounts, and notify the point of sale agents of same (51). The point of sale agents may correspondingly communicate this data to the order manager, which may aggregate the data (if it must be received from more than one point of sale agent, based on the items ordered) and present it to the consumer, who may be given an opportunity for final approval (53). The final order may be submitted to the point of sale systems by means of the point of sale agents, where payment may be confirmed and the order fulfilled (55). It should be understood that this transaction is just one example of using the present invention, and in particular that the order or necessity of particular steps could be modified.

The order manager may also include a query interface for obtaining static point of sale data. For example, during a transaction a consumer may initially browse a menu and look at options and pricing prior to starting the ordering process. The type of point of sale data required to support this activity is typically static and may be stored in the point of sale database. The order manager may access the point of sale data from the point of sale database rather than the point of sale systems, in order to reduce bandwidth and load on the point of sale systems. When a consumer attempts to fulfill a transaction the order manager may then communicate with a point of sale system to confirm the point of sale data (for example to establish final pricing).

The campaign manager may be operable to disseminate one or more promotions to one or more consumers based on the point of sale data and direct the one or more consumers to access the order interface. A promotion configuration utility may be provided by the campaign manager or linked to the campaign manager, for example being provided by the point of sale system, for creating and configuring promotions. The promotion configuration utility allows an entity or entities to initiate a promotion (by specifying items, pricing, and promotion time period) using any of (i) a web interface to the campaign manager; (ii) pre-existing means provided by a point of sale system and accessible by an API to a point of sale agent; and/or (iii) another custom interface such as a mobile application, etc.

The campaign manager may also include or be linked to a promotion database that is operable to store promotions. A promotion may typically encapsulate a temporary offer or special that is used to drive consumer traffic to a specific entity or entities. The promotion configuration utility may be used to configure information regarding pricing, the specific items that are being promoted, the time period the promotion is in effect, how to incorporate the promotion into the ordering workflow, the channels used to disseminate the promotion, keywords to be used for contextual advertisement placement (if applicable), and a hyperlink to the order interface for enabling a consumer to participate in the promotion. The campaign manager may provide one or more sets of default campaign rules for simplifying the process of configuring a promotion. The configuration of the promotions may be stored to the promotion database.

The promotions may be disseminated either by active or passive channels. Passive channels may include, for example, contextual advertisements on search engine websites and active channels may include, for example, social media feeds, emails, Internet-enabled messaging, etc. These channels may be linked to the campaign manager by APIs provided by channel owners/administrators. The campaign manager may include or be linked to a campaign rules database that is operable to store rules for promotions by means of the active and/or passive channels. For example, the campaign rules database may include rules for character limits for particular social media feeds, font limitations for particular channels, etc.

The campaign manager is operable to disseminate the promotion online in accordance with the configuration of the promotion. The disseminated promotion includes the pre-configured hyperlink enabling a consumer to access the order interface. The order interface can be dynamically configured in response to a consumer accessing the order interface by means of a promotion. For example, a promotion for a specific item offered by a specific entity includes a hyperlink to the order interface preconfigured with that item and entity already selected. Discounts and other offers for the promotion can also be preconfigured in the order interface. The order interface and order manager can then be used as described above.

The campaign manager may monitor promotions that are currently in effect, initiate notifications to be sent to owners/administrators or promotion issues, record metrics and click-through information, and deactivate expired promotions. The campaign manager may provide historical data for promotions to enable optimum configuration of future promotions.

Figure 4:
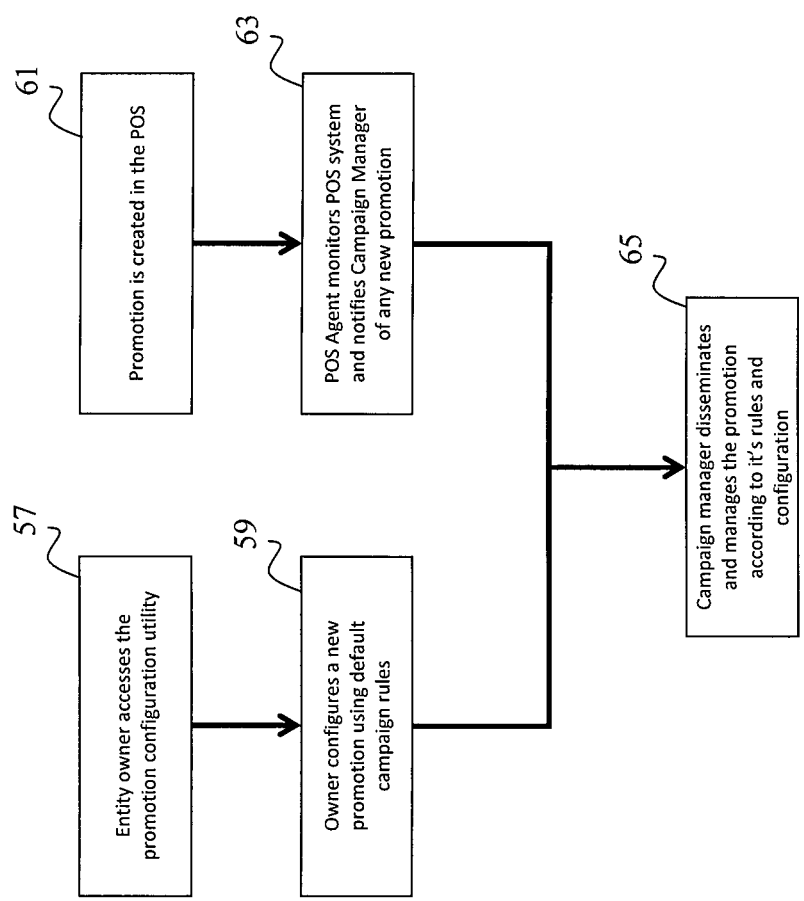
FIG. 4 illustrates an entity owner accessing the promotion configuration utility.

FIG. 4 illustrates a particular example in which an entity owner may access the promotion configuration utility (57). The owner may select one of one or more default campaign rules made available by the promotion configuration utility to simplify configuration of the promotion (59). The owner may also configure the promotion to include the items, prices, discounts, and dissemination channels for the promotion.

In an alternate example, the promotion may be created or configured on a point of sale system using a workflow enabled by the point of sale system (61). The corresponding point of sale agent may monitor the point of sale system and become aware of any such promotions, and may notify the campaign manager of same by means of the order manager (63).

The promotion configuration utility may generate a hyperlink for linking the promotion to the order interface. The promotion may be verified against campaign rules from the campaign rules database for each of the selected dissemination channels, and warnings may be provided to the owner for any non-compliant configuration. A compliant configuration may be saved to the hyperlink to the promotion database. The campaign manager may disseminate the promotion by means of the selected dissemination channels in accordance with the configuration of the promotion (65).

The system may also include an administration utility for enabling administration of the system, analytics, and reporting of data collected by the order manager and campaign manager.

For example, the administration utility may enable remote diagnostics and/or provisioning of point of sale systems and/or point of sale agents. For example, fixes, patches and/or functionality improvements may be provisioned to the point of sale agents from the administration utility.

The analytics and reporting of data may include order history for a consumer; order history for an entity; promotion history; click-through rates; fulfillment rates; promotion history by price, location, items, channel, or any other indicator; diagnostic information including point of sale system uptime, response rates, etc.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

We claim:

1. A system for integrating a plurality of diverse point of sale systems, the system comprising:
   a first computer processor in communication with the plurality of diverse point of sale systems, wherein each diverse point of sale system of the plurality diverse point of sale systems generates non-compatible point of sale data, the first computer processor configured to communicate with each of the plurality of diverse point of sale systems using a point of sale agent;
   a second computer processor linked to the first computer processor, the second computer processor configured to operate an order manager; and
   a memory storage unit for storing a point of sale database, wherein the point of sale database provides a common data model configured to be recognized by the order manager, the common data model including fields corresponding to at least one of a point of sale system identifier, pricing, and promotions, wherein the point of sale agent receives the non-compatible point of sale data from each of the plurality of diverse point of sale systems and the order manager, the point of sale agent further configured to map the point of sale data to the common data model.

2. The system of claim 1, wherein the order manager comprises an order interface for receiving input from a consumer and interacting with the plurality of diverse point of sale systems.

3. The system of claim 2, wherein the input from the consumer is configured to make purchases corresponding to point of sale data.

4. The system of claim 2, further comprising third computer processor configured to operate a campaign manager, the third computer processor linked to the second computer processor, the campaign manager configured to:
 disseminate one or more promotions to the consumer based on the point of sale data; and
 direct the consumer to access the order interface.

5. The system of claim 4, wherein the order interface is a website and the one or more promotions include a hyperlink to the website.

6. The system of claim 4, wherein the one or more promotions are disseminated through a medium selected from the group consisting of contextual advertisements, social media feeds, emails, Internet-enabled messaging, or any combination thereof.

7. The system of claim 4, wherein the one or more promotions are created using the order manager or one of the diverse point of sale systems.

8. The system of claim 1, wherein the order manager is configured to:
 compare the non-compatible point of sale data from each diverse point of sale system of the plurality of diverse point of sale systems with the point of sale database; and
 selectively update the point of sale database based on a comparison.

9. A network implementable method of integrating a plurality of diverse point of sale systems, the method comprising:
 mapping non-compatible point of sale data communicated by each diverse point of sale system of the plurality of diverse point of sale systems to a common data model configured to be recognized by an order manager, the common data model including fields corresponding to at least one of a point of sale system identifier, pricing, and promotions; and
 communicating, using one or more point of sale agents, the point of sale data between each diverse point of sale system of the plurality diverse point of sale systems and the order manager in accordance with the common data model.

10. The method of claim 9, wherein the order manager comprises an order interface, and wherein the method further comprises the step of receiving input from a consumer to access the order manager by the order interface to interact with the diverse point of sale systems.

11. The method of claim 10, further comprising the step of using the input to make purchases corresponding to point of sale data.

12. The method of claim 10, further comprising the step of linking a campaign manager to the order manager, wherein the campaign manager is operable to:
 disseminate one or more promotions to the consumer based on the point of sale data; and
 direct the consumer to access the order interface.

13. The method of claim 12, wherein the order interface is a website and the one or more promotions include a hyperlink to the website.

14. The method of claim 12, wherein the one or more promotions are disseminated through a medium selected from the group consisting of contextual advertisements, social media feeds, emails, Internet-enabled messaging, or any combination thereof.

15. The method of claim 12, further comprising the step of enabling the creation of the one or more promotions are using the order manager or one of the diverse point of sale systems.

16. The method of claim 9, further comprising the steps of:
 linking a point of sale database to the order manager the point of sale database providing the common data model configured to be recognized by the order manager; and
 storing the non-compatible point of sale data from each diverse point of sale system of the plurality of diverse point of sale systems to the point of sale database.

17. The method of claim 16, further comprising the steps of:
 comparing the non-compatible point of sale data from each diverse point of sale system of the plurality of diverse point of sale systems with point of sale data stored in the database; and
 selectively updating the database based on a comparison.

18. The method of claim 16, further comprising the steps of:
 the one or more point of sale agents notifying the order manager of a modification to the non-compatible point of sale data of at least one diverse point of sale system of the plurality of diverse point of sale systems; and
 the order manager updating the point of sale database in response to a notification of modification.

19. The system of claim 1, wherein the first processor is configured to operate the point of sale agent.

20. The system of claim 1, wherein at least one diverse point of sale system of the plurality of diverse point of sale systems is configured to operate the point of sale agent.

* * * * *